Sept. 16, 1969     A. C. WALKER     3,467,213
GAS TURBINE POWERED AIR-CUSHION VEHICLE WITH
PROPULSIVE JET MEANS
Filed July 31, 1967     2 Sheets-Sheet 1
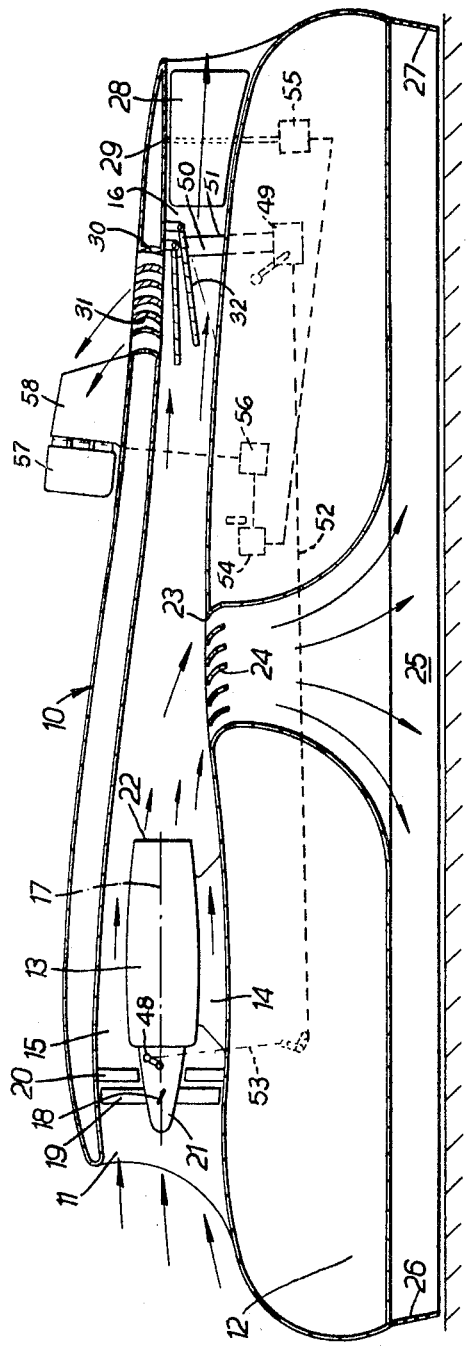
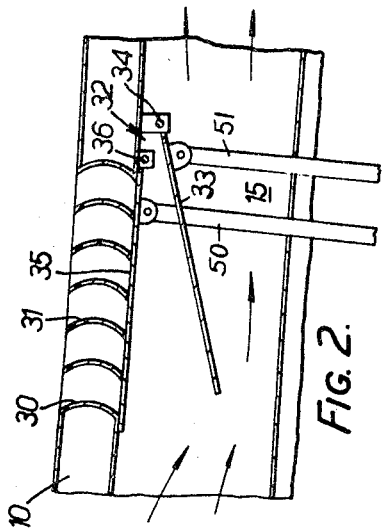
INVENTOR
ALLEN C. WALKER
BY
ATTORNEYS Sept. 16, 1969   A. C. WALKER   3,467,213
GAS TURBINE POWERED AIR-CUSHION VEHICLE WITH
PROPULSIVE JET MEANS
Filed July 31, 1967   2 Sheets-Sheet 2
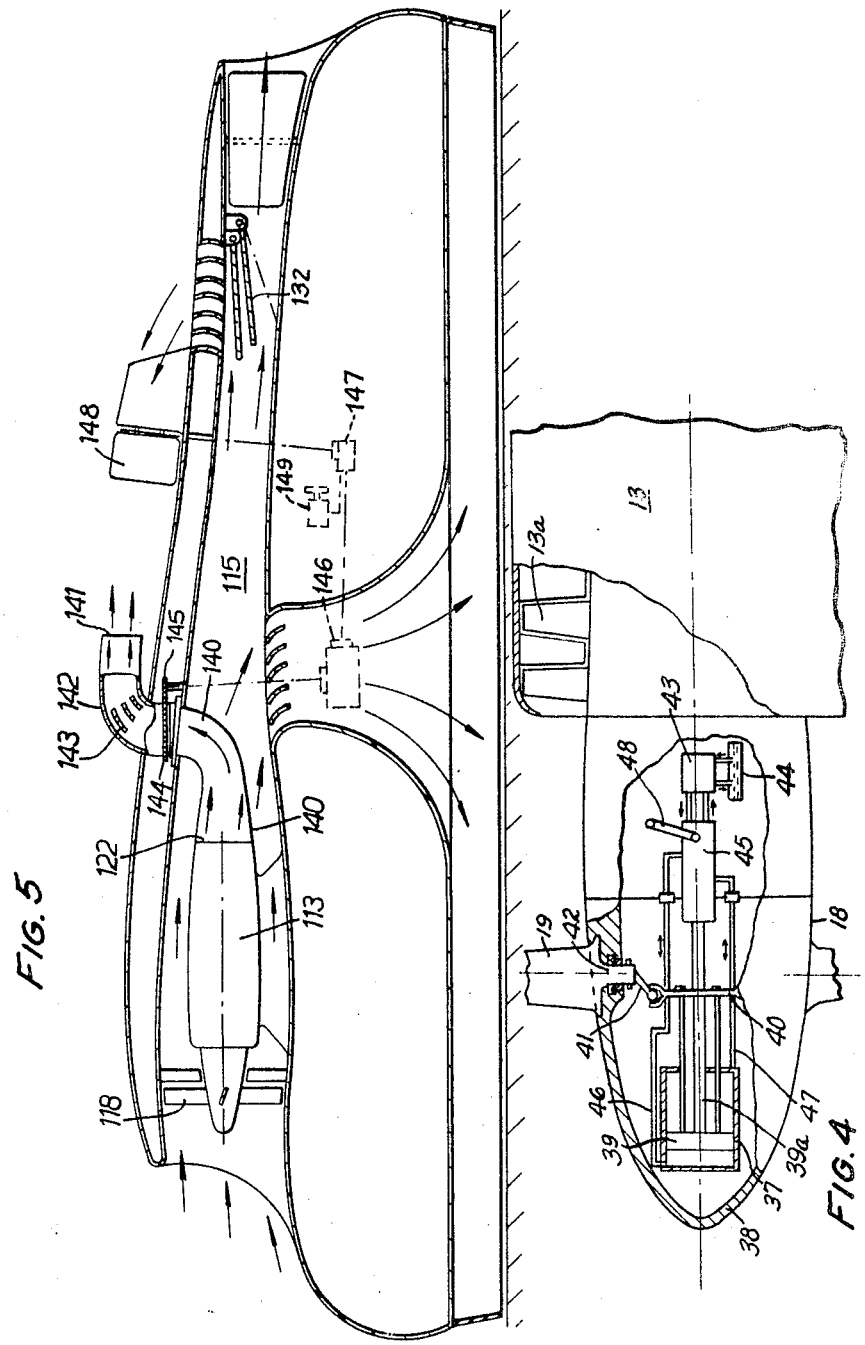
INVENTOR
ALLEN C. WALKER
BY
Christman, Sabers & Matthews
ATTORNEYS United States Patent Office 3,467,213
Patented Sept. 16, 1969

3,467,213
GAS TURBINE POWERED AIR-CUSHION VEHICLE WITH PROPULSIVE JET MEANS
Allen C. Walker, near Stroud, England, assignor to Dowty Rotol Limited, Gloucester, England, a British company
Filed July 31, 1967, Ser. No. 657,140
Claims priority, application Great Britain, Aug. 17, 1966, 36,891/66
Int. Cl. B60v 1/02, 1/14; F04d 27/00
U.S. Cl. 180—120                          10 Claims

ABSTRACT OF THE DISCLOSURE

An air-cushion vehicle includes at least one ducted-fan assembly having adjustable blading and powered by a prime mover, such as a gas turbine engine. The flow of air discharged by the ducted-fan assembly is directable both into the air cushion zone of the vehicle for support of the vehicle above the surface over which it is operating, and also through a discharge duct to provide a propulsive jet into air for either forward or rearward movement of the vehicle across that surface.

FIELD OF THE INVENTION

This invention relates to air-cushion and like vehicles.

SUMMARY OF THE INVENTION

According to this invention an air-cushion or like vehicle includes at least one ducted-fan assembly having adjustable blading and powered by a prime mover, the flow of air discharged by the ducted-fan assembly being directable both into the air-cushion zone of the vehicle for support of the vehicle above the surface over which it is operating, and also through a discharge duct to provide a propulsive jet into air, for movement of the vehicle across the surface.

Steering means are preferably provided in association with the discharge duct for manoeuvring of the vehicle.

First cascade means may be provided, intended to ensure a smooth and efficient entry of discharge flow into the air-cushion zone.

Second cascade means may be provided in the wall of the discharge duct, and flap valve means provided in operable association therewith, carried within the discharge duct serve, when operable, to close the discharge duct but to re-direct the flow so that it passes through the second cascade means to afford movement of the vehicle in the reverse direction, or braking of the vehicle.

Reverse steering means may be provided in association with said second cascade means for affording steerability of the vehicle when operating in the reverse direction.

A portion of said flap valve means may be capable of adjustment thus to vary flow through the discharge duct, and thus to vary the thrust of the propulsive jet.

The ducted-fan assembly may include rotor blading and stator blading, either or both of which is or are adjustable.

The adjustable blading may be of variable-pitch.

The said prime mover may be a gas turbine engine, and in this case the exhaust gases discharging from the engine may be mixed with the air discharged by the ducted-fan assembly, or alternatively, the exhaust gases may be discharged through suitable ducting directly to atmosphere.

The blading adjustment may be controlled by an hydraulically-amplified follow-up servo system, receiving manual input signals or speed-governor signals.

BRIEF DESCRIPTION OF THE DRAWINGS

Of the five accompanying diagrammatic drawings:
FIGURE 1 is a part-cross-sectional view of an air-cushion vehicle in accordance with a first embodiment,
FIGURE 2 is an enlarged cross-sectional view of a portion of the air-cushion vehicle shown in FIGURE 1 in one mode of operation,
FIGURE 3 is a view similar to that of FIGURE 2, but in a different mode of operation,
FIGURE 4 is a partial cross-section of the by-pass fan engine shown in FIGURE 1, and
FIGURE 5 is a part-cross-sectional view of an air-cushion vehicle in accordance with a second embodiment of the invention.

DESCRIPTION OF THE PREFERRED EMBODIMENTS

Referring to FIGURES 1, 2, 3, and 4 of the drawings, an air-cushion vehicle 10, in accordance with the first embodiment, comprises a cabin section shown generally at 11, a buoyancy and skirt section, shown generally at 12, defining an air-cushion, and a single ducted-fan by-pass type gas turbine engine 13 mounted on a narrow streamlined platform 14 in a longitudinal through duct 15. This duct opens at the forward end portion of the vehicle and passes along the length of the vehicle, terminating in a discharge section 16, which opens to the rear of the vehicle.

The gas turbine engine 13 is mounted on the narrow streamline platform 14 in such a manner that its rotational axis is substantially coincident with the longitudinal axis 17 of the duct. The rotary system of the engine 13 is coupled to drive an axial-flow single-stage fan 18 having blades 19 of variable-pitch, a small running clearance being provided between the blade tips and the duct 15. Just downstream of the fan blades 19 there is a row of stator blades 20 of fixed pitch.

The fan 18 is thus so arranged that in operation it not only charges the compressor 13a of the engine, but also charges the duct 15, which bypasses the engine, with compressed air.

The hub 21 of the fan 18 includes a pitch-change mechanism, itself forming part of an hydraulically-amplified follow-up servo system having a manual input.

A diagrammatic representation of this system is shown in FIGURE 4. The system includes a hydraulic pitch-change motor 37 housed in the hub 38 of the fan 18. The piston 39 of the pitch-change motor is connected to a unison ring 40 to which are coupled crank-pins 41 formed upon the root portions 42 of the blades 19. A pump 43 which draws liquid from a reservoir 44 delivers liquid under pressure to a control valve 45, and lines 46 and 47 are taken from this valve to the pitch-change motor in the manner shown. The piston-rod 39a of the piston 39 extends to, and co-operates with, the valve 45, so that upon operation of the pitch-change motor in response to selection by the lever 48 of the valve, the piston-rod affords follow-up to cancel the selected signal when the required new pitch setting of the blades is reached. A ducted-fan by-pass type gas turbine engine, with such associated pitch-change mechanism and control system, is fully described in the specification of co-pending U.S. patent application Ser. No. 630,250.

The jet nozzle 22 of the gas turbine engine 13 opens into the longitudinal duct 15, and just downstream of the lower wall of the nozzle, the duct is provided with a relatively large aperture 23, which incorporates a first cascade vane assembly 24 which opens into the zone 25 forming the air-cushion, the structure defining the air-cushion being of conventional type with perimeter skirts as at 26 and 27. The assembly 24 is intended to afford smooth and efficient entry of air/gas mixture into the zone 25.

The discharge section 16 of the longitudinal duct 15 is provided with a rudder assembly 28 in the form of a pair of parallel vanes hinged, as at 29, about spaced vertical axes adjacent the duct exit, the assembly being capable of deflecting the jet discharging from the duct for steering of the vehicle.

Just upstream of the discharge section 16, the upper wall of the duct 15 is provided with a further relatively large aperture 30 in which a second or reversing cascade vane assembly 31 is fitted, this opening directly to atmosphere above the vehicle.

Hingedly mounted in the duct 15 and in association with the assembly 31 is a double-flap assembly 32 which is shown more clearly in FIGURES 2 and 3. One portion of this assembly, that is the flap 33 which is pivotally mounted at 34, is intended for thrust-reduction, while the other portion of the assembly, that is the flap 35, which is pivotally mounted at 36, is intended for thrust-reversing control.

When the air-cushion vehicle 10 is required to move forwardly, the assembly 32 is operated such that the flap 35 covers the second or reversing cascade vane assembly 31. However, the flap 33 can be hinged downwardly about its pivotal mounting 34 so that it forms a restriction in the duct 15, the amount of this restriction being adjusted in accordance with required operating conditions.

Further, both flaps 33 and 35 can be hinged downwardly together about their respective pivotal mountings 34 and 36, so that the flap 33 prevents flow of gas and air from the ducted-fan gas turbine engine 13 from passing through the normally-rearwardly-directed exit and rudder assembly 28 and so that the flap 35 instead re-directs this flow through the second or reversing cascade vane assembly 31.

FIGURE 2 shows the double-flap assembly 32 in the position for forward operation of the vehicle, while FIGURE 3 shows the double-flap assembly in the position for reverse operation of the vehicle.

The control system for the double-flap assembly comprises a double actuator unit 49 including a correlating mechanism therein and output links 50 and 51 respectively connected with the flaps 33 and 35. This system is interconnected by linking 52 and 53 with the input lever 48 of the follow-up servo system (FIGURE 4) for controlling the pitch of the blades 19 of the ducted-fan 18, so that during forward movement of the vehicle desired correlation is provided by said correlating mechanism between blade pitch setting and the setting of the thrust reduction portion, that is the flap 33, of the double-flap assembly 32.

In operation of the air-cushion vehicle, the gases discharged by the engine jet nozzle 22 and the air by-passing the engine under the operation of the ducted-fan 18 mix downstream of the engine, a proportion of the flow passing through the first cascade vane assembly 24 into the air-cushion zone 25 to provide such fluid support for the vehicle as to maintain it at a predetermined height above the surface over which the vehicle is operating.

The remainder of the air and gas mixture in the longitudinal duct 15, and which is surplus to the requirements of the air-cushion for maintaining the predetermined height, passes rearwardly along the duct 15 and with the double-flap assembly 32 in the position shown in FIGURE 2, the mixture passes to the rear exit of the duct, from which it is discharged as a propulsive jet for forward propulsion of the vehicle. Steering of the vehicle is achieved by appropriate positioning of the rudder assembly 28 under the control of a steering controller 54 which operates a steering actuator 55.

During such forward propulsion of the vehicle, the flap 33 of the double-flap assembly 32 is adjusted to vary the jet propulsion effect, and at the same time the fan blade pitch is adjustable to obtain the optimum matching between engine and fan operation. The correlation between the blade pitch control system and the control system of the double-flap assembly is such as to provide, in the operation of the vehicle, a range of propulsive thrusts for a fixed pressure condition in the air-cushion zone 25.

When it is required to brake the vehicle and/or to effect movement of the vehicle in the reverse direction, the flaps 33 and 35 of the double-flap assembly 32 are together moved to the position shown in FIGURE 3 in which the flap 33 closes across the duct 15 thus closing off flow to the discharge section 16, while the flap 35 moves sufficiently far downwardly about its pivotal mounting 36 to permit the mixture of air and gas, which is surplus to the requirements of the air-cushion 25, to pass into and through the second or reversing cascade vane assembly 31.

The vanes of the assembly 31 are so shaped that this flow is directed forwardly of the vehicle to obtain braking and/or reverse movement of the vehicle.

Steering of the vehicle in reverse is achieved by selective operation of a reverse steering actuator 56 which is operated by the steering controller 54. This actuator operates a reverse-steering rudder 57 which is mounted upon a fin 58.

Referring now to FIGURE 5 of the drawings, in the second embodiment of the invention an air-cushion vehicle is very similar to the construction of the first embodiment, except that instead of the exhaust gases passing through the nozzle 122 of the engine 113 mixing with the air discharged by the ducted-fan 118, as was the case with the first embodiment, the jet pipe or exhaust ducting 140 of the engine is extended and curves upwardly in the drawing passing through the structure of the vehicle above the duct 115, the jet pipe orifice 141 opening directly to atmosphere, and in a direction rearwardly of the vehicle.

As shown, the portion 142 of the jet-pipe externally of the evhicle is angularly adjustable and includes a cascade 143. In order to effect this adjustment, a gear ring 144 fast with that portion 142 of the jet-pipe is engaged by a pinion 145, itself driven by an actuator 146. In the position shown in the drawing, the portion 142 permits flow of engine exhaust gases from the jet pipe in the rearward direction.

The actuator 146 is inter-connectible with an actuator 147 which operates the rudder 148 associated with the double-flap assembly 132, both actuators being operable selectively under the control of a steering controller 149.

However, when it is required to brake the vehicle or to cause movement of the vehicle in the reverse direction, the portion 142 of the jet-pipe is angularly adjusted simultaneously with movement of the double-flap assembly 132, to its reversing position gas flow instead being directed by the cascade 143 substantially forwardly of the vehicle. Thus the discharging gases now assist in the braking or reversing operation and the adjustability of the jet-pipe affords steerability in reverse.

Again, although in the first-described embodiment the stator blades of the ducted-fan assembly are of fixed pitch, in other embodiments the stator blades are also of variable pitch.

Again, the invention is in no way limited to a single-stage ducted fan assembly, as in other embodiments a multi-stage ducted fan assembly, having adjustable rotor blading may be provided.

Further, in other embodiments more than one ducted-fan engine may be employed where the dimensions of the vehicle are such as to make this necessary.

Although in the first-described embodiment the control system for variation in fan-blade pitch is operable under manual input signals, in alternative embodiments engine speed-responsive governor means are used for initiation of the pitch-changing function.

Again, in certain embodiments no stator blades are provided in the ducted-fan assembly.

What is claimed is:
1. In an air-cushion vehicle having an air cushion zone into which a flow of air is directed for support of the vehicle above a surface, the combination comprising a through duct extending along the vehicle and terminating in a discharge section, streamlined mounting means ex- tending inwardly from the wall of the duct, a gas turbine engine of the ducted-fan by-pass type supported wholly within said duct upon said mounting means and having a by-pass fan mounted for rotation in the duct ahead of the engine's compressor whereby the fan in operation charges both the engine's compressor and the duct with air, said fan having a hub portion and a plurality of blades mounted within said hub portion so as to be adjustable, and a motor for effecting blade adjustment, and means for directing said air into both said air-cushion zone to support the vehicle above said surface and through the discharge section of said duct to provide a propulsive jet to assist in movement of the vehicle across said surface.

2. The combination defined in claim 1 including steering means mounted in association with said discharge section, a steering controller, and an actuator responsive to the steering controller and coupled with the steering means to actuate same for manoeuvring said vehicle.

3. The combination defined in claim 1 including first cascade means positioned to provide a smooth and efficient entry of discharge flow from said through duct into said air-cushion zone.

4. The combination defined in claim 1 including second cascade means mounted in the wall of the discharge section to provide communication with the exterior of the vehicle, and flap valve means coupled with said second cascade means and operable to close the discharge section to re-direct air flow therein to pass through said second cascade means to atmosphere.

5. The combination defined in claim 4 including reverse steering means mounted in association with said second cascade means to effect steering of the vehicle when operating in the reverse direction.

6. The combination defined in claim 4 wherein said flap valve means includes means operable to adjust air flow through said discharge section.

7. The combination defined in claim 1 including an hydraulically-amplified follow-up servo system coupled to control the adjustment of said fan blades.

8. The combination defined in claim 7 including a control system having linkage and actuator means interconnecting said follow-up servo system with both said blade adjustment means and said flap valve means for correlating blade adjustment and positional control of the flap valve means to provide a range of propulsive thrusts for a fixed pressure condition in the air-cushion zone.

9. The combination defined in claim 1 including exhaust duct means coupled with said engine for discharging exhaust gases therefrom directly to atmosphere separate from the aid discharged by said by-pass fan.

10. The combination defined in claim 9 including cascade means coupled with said exhaust duct means and normally positioned to direct said exhaust gases rearwardly of the vehicle, said cascade means being also positionable to direct said exhaust gases in directions substantially forwardly of the vehicle for braking, reversing, and steering the vehicle in reverse.

References Cited
FOREIGN PATENTS

| | | | |
|---|---|---|---|
| 3,124,322 | 3/1964 | Cockerell | 180—117 X |
| 3,150,732 | 9/1964 | Walker | 180—122 |
| 3,174,570 | 3/1965 | Cockerell | 180—120 |
| 3,253,666 | 5/1966 | Kiernan et al. | 180—122 |
| 3,269,476 | 8/1966 | Jones | 180—129 |
| 3,302,602 | 2/1967 | Korganoff | 180—120 X |
| 3,306,387 | 2/1967 | Chaplin | 180—121 |
| 3,330,221 | 7/1967 | Trillo | 180—127 X |

FOREIGN PATENTS 980,570   1/1965   Great Britain.

A. HARRY LEVY, Primary Examiner

U.S. Cl. X.R.

230—114